United States Patent Office 3,383,281
Patented May 14, 1968

3,383,281
METHOD FOR BINDING BILE ACIDS IN VIVO
Frank J. Wolf, Westfield, N.J., and David M. Tennent, Ashland, Ohio, assignors to Merck & Co., Inc., Rahway, N.J., a corporation of New Jersey
No Drawing. Continuation-in-part of application Ser. No. 40,157, July 1, 1960, which is a continuation-in-part of application Ser. No. 748,598, July 15, 1958. This application Sept. 22, 1961, Ser. No. 139,879
5 Claims. (Cl. 167—65)

This application is a continuation-in-part of our copending application, Serial No. 40,157, filed July 1, 1960, which was a continuation-in-part of Serial No. 748,598, filed July 15, 1958 both now abandoned.

This invention relates to methods and compositions for binding bile acids in the intestinal tract, a process which has two very important effects, namely the reduction of blood cholesterol levels in mammals and birds having hypercholesteremia and the relief of pruritis in patients suffering from bile stasis.

We have found that bile acids can be effectively bound in the intestinal tracts, and thus placed in a condition to be excreted in a biochemically and physiologically inert (i.e., an unabsorbable) condition, by the oral administration of non-toxic water insoluble polymeric amines having a molecular weight greater than 3000, the property of binding at least 30% of the available glycocholic acid when exposed to an equal weight of said acid, having a polymer skeleton inert to digestive enzymes, and which, after equilibration with air at 100% relative humidity, have a moisture content greater than 68%. Particularly desirable are the non-toxic quaternary ammonium salts.

Certain ion exchange resins have been reported in the past to have been tested in the binding of ions such as chloride. These resins, however, do not meet the criteria necessary for the binding of bile acids, as discussed below.

Heart disease has been the leading cause of death in the United States in recent years. Atherosclerosis is one of the most significant forms of cardiovascular disease because of its frequent occurrence and its predilection for serious ailments such as coronary thrombosis. Atherosclerosis is characterized by thickening of initima, reduction in diameter, and loss of elasticity of arteries, due to fatty accumulations. Higher blood levels of cholesterol are observed in atherosclerosis patients than in normal persons. Accordingly, it is considered important in the treatment and prevention of atherosclerosis to maintain normal blood cholesterol levels.

The common atherosclerosis therapy up to the present time has been a low fat diet, devoid as far as possible of animal fats. This necessitates reduced consumption of nutritious foods such as meat, milk, and eggs. It is evident that a more desirable therapy would be to permit the patient to have a normal diet and to maintain the cholesterol blood level where desired by control with a therapeutic agent. However, prior to the present invention no therapeutic agents for maintaining desired blood levels of cholesterol which are both safe and effective have been found.

As a result of the present invention it has been found that blood levels of cholesterol can be maintained at a desired level by the oral administration of non-toxic glycocholic acid-binding water insoluble polymeric amines having a molecular weight in excess of 3,000 and which, after equilibration with air at 100% relative humidity, have a moisture content greater than 65%. Particularly desirable are the non-toxic quaternary ammonium salts which are included within the term "polymeric amine."

Pruritis, or severe itching, especially at the anus, is a major complaint of persons suffering from interference with normal excretion of bile, as in biliary cirrhosis or other forms of bile stasis. This can be so severe that patients are known to contemplate suicide. Until recently, the control of such pruritis has been unsatisfactory, being principally surgical biliary drainage.

It has now been found that dramatic reduction of the itching associated with bile stasis occurs when the bile acids in the gut are bound by the method of this invention. Further, there is no rise in serum bilirubin nor any adverse effect of the treatment on liver function as measured by standard tests. The morale of patients is strikingly enhanced. In certain cases, where the cause of biliary stasis is a blocking of the bile duct, the binding of bile acids in the gut has no effect.

Ability to remove glycocholic acid from aqueous solutions in vitro is a good test of the polymers useful in the present invention. All polymers which have been found effective in binding bile acids in vivo are capable of removing glycocholic acid from aqueous solution in vitro. Polymers which do not remove glycocholic acid from aqueous solution are ineffective in vivo. The effective resins bind at least 30% of the glycocholic acid within 5 minutes when a solution of sodium glycocholate is exposed to an equal weight of resin. Glycocholic acid is removed by removal as a precipitate. The effective insoluble anion exchange resins remove glycocholic acid as a precipitate, presumably the glycocholate form of the resin.

The surprising correlation between glycocholic acid-binding power in vitro, binding of bile acids in vivo, and the ability to reduce cholesterol blood levels in man and other animals apparently can be explained by the fact that the system maintains a substantially constant bile acid level in spite of the administration of a material which effectively removes bile acids from the system. Administration of a polymer according to this invention probably prevents bile acid readsorption in vivo. Cholesterol is oxidized to bile acids so as to maintain a substantially constant bile acid level, resulting in a lowered cholesterol blood level. This is considered the most probable explanation of the action of polymers administered according to this invention, although we do not wish to be bound by any theory by way of explanation.

Why the binding of bile acids in the gut should prove to be such a competent answer to pruritis is not completely understood since attempts to correlate the presence of pruritis with the degree of retention of bile acids in the gut has given equivocable results in the past. A rough correlation exists, however, between serum bile acids levels and the presence or absence of pruritis.

Polymers having a molecular weight of about 3,000 or higher are preferred in vivo bile acid binding agents. These materials are not absorbed in the alimentary tract and therefore do not cause toxic effects. In determining the polymeric amines to use, the important property is their hygroscopy. Peculiarly, only those polymers which, after equilibration with air at 100% relative humidity, have a water content greater than 65% are operable in effectively binding bile acids in the gut. Why this hygroscopy should correlate with the ability to bind bile acids is not clear but experimentally it does, just as the binding power correlates with reduction of blood cholesterol and relief of pruritis.

The polymeric amines also should have a polymer skeleton (i.e., the fundamental atom chain of the polymer) inert to digestive enzymes. Since the latter act usually by hydrolysis, this means that there should be no easily hydrolyzed amide ester, or similar links in the polymer. Otherwise fragments of too low a molecular weight for effective sequestration may be formed.

Various polymeric substances have been found to be useful according to the present invention. They all are polymeric amines having ionizable amino groups, such as amine salt or quaternary ammonium groups (as contrasted with pseudo amino-nitrogens such as amide groups). One class of useful substances is water-insoluble synthetic anion-exchange resins, which owe their exchange capacity to amino groups and which have only a low degree of cross-linkage.

One class of effective resins are the "Dowex 1" resins, which are polystyrene resins cross-linked with varying percentages of divinyl benzene, made by Dow Chemical Co., Midland, Mich. Quaternary ammonium groups are introduced into such resins by chlormethylation of the aromatic rings and replacement of the chlorine by a tertiary amine such as trimethyl amine to form, e.g., a trimethyl ammonium group. These quaternary ammonium resins are useful in the form of a non-toxic salt, such as the chloride, sulfate, acetate, phosphate, or the like, or in the hydroxyl form. Any of the "Dowex 1" series resins which contain 5% or less of divinyl benzene, as for example "Dowex 1 x 1," "Dowex 1 x 2," and "Dowex 1 x 4," which contain 1%, 2% and 4%, respectively, of divinyl benzene, are useful. The efficacy in bile acid binding decreases as the percentage of cross-linking agent increases. Cross-linkage in excess of about 5% seriously impairs the efficacy of these resins. These resins can be made as described in United States Patent 2,591,573. Other insoluble amine salt type resins which are cross-linked to only a limited degree are also useful in cholesterol blood level reduction. The above resins can be further modified in a number of ways. The quaternizing tertiary amine which is reacted with the chlormethyl group can be any other tertiary amine or cyclic tertiary amine such as dimethylamine ethanol, pyridine, picoline, etc. The extent of chlormethylation can be varied so that the number of active quaternary ammonium groups per chain is varied. Activity is observed with as low as 40% of the theoretically possible active sites. The aromatic ring can have other substituents such as chlorine or methyl.

Another type of cross-linked amine polymer comprises the polyethylene imines which have been cross-linked by reaction with a poly functional halogen compound, the halogen being displaced by the imine nitrogens in the chain with loss of the hydrogen. Again here, the amount of cross-linking must be kept to a minimum.

Other types of cross-linked polymeric amines having ionizable amino groups will be obvious to those skilled in the resin art. The ability to lower the cholesterol level in the blood and relieve pruritis is a function of the binding in vivo of bile acids, which is in turn dependent on the chemical property of binding glycocholic acid in vitro and the physical property of having a water content of more than 65% after equilibration with 100% relatively humid air. No matter what the structure, so long as it is a water insoluble polymeric amine with ionizable amino groups, a molecular weight of over 3,000, a polymer skeleton inert to digestive enzymes, and has the above properties, it will be operable.

The minimum effective daily dosage of the useful polymers is about 0.5 g./day in man. Because of the low toxicities of the useful polymers, extremely high dosages can be given without ill effect. From the standpoint of cholesterol serum level reduction or relief of pruritis, no advantages accrue in increasing the daily dosage above 250 g. Preferred dosages lie in the range of about 1 to 100 g./day.

Conventional pharmaceutical formulations of resins according to the present invention can be made. In all these formulations it is desirable that the resin be of a fine particle size, preferably 200 to 400 mesh. The usual pharmaceutical formulations, such as tablets, elixirs, syrups, aqueous solutions, or suspensions and the like, are suitable. The unit dosage is of a convenient size, as for example, tablets from 100 mg. to one gram, or suspensions containing from about 100 mg. to 20 grams of polymer.

Examples of various pharmaceutical formulations are as follows:

Formulation 1

Capsules containing a mix of the following ingredients are prepared:

|  | Mg. |
| --- | --- |
| "Dowex 1 x 2," anhydrous | 500.0 |
| Magnesium stearate | 5.0 |
| Net weight | 505.0 |

The resin is mixed with magnesium stearate which serves as a lubricant, and the mixture is filled into No. 0 gelatin capsules.

Formulation 2

A suspension for oral administration is prepared with the following composition:

| | |
| --- | --- |
| "Dowex 1 x 2" aqeous suspension (25% solids) gm | 40.0 |
| Tragacanth gm | 0.27 |
| Sweetening agent (10 parts sodium cyclamate plus one part sodium saccharin) cc | 0.9 |
| Glycerin U.S.P. gm | 3.6 |
| Water q.s. ml | 90.0 |

The glycerin and tragacanth are mixed and added to 45 ml. of water. The mixture is agitated until homogeneous and heated to about 50° C. The resin is added, followed by the sweetening agent and water to bring the total volume of the suspension to 90 ml. The suspension is agitated and milled.

The sweetening agent specified in this formulation is used in all formulations in this application where a sweetening agent is specified.

Conventional preservatives, flavoring agents, and coloring matter may be added, if desired, to any of the above formulations. The formulations for administering the resins can also be in the form of low calorie diets for treatment of hypercholesteremia in obese patients. Such compositions include various food chemicals—vitamins, minerals, fats, proteins, carbohydrates, etc.—to form a balanced diet, as well as flavoring agents and dispersing agents. For treatment of pruritis, very low calorie compositions are usually used.

The resins can also be incorporated in a variety of solid foods such as bread, cookies, cake, cereals, desserts, fruit dishes (e.g., applesauce) and the like. The term "orally ingestible carrier" in the claims is intended to include such materials as well as the usual pharmaceutically acceptable carriers such as capsules, tableting ingredients, syrup compositions, aqueous solutions and suspensions and the like.

Resins and polymers which are effective in reducing blood cholesterol concentration are also found to remove glycocholic acid from aqueous solutions. Examples 1 and 2 illustrate the removal in vitro of glycocholic acid from aqueous solution by solid resins.

Example 1

An aqueous solution containing 10 g./liter of sodium glycocholate was prepared and divided into 25-ml. aliquots. This solution was assayed according to the following procedure: An aliquot of the solution was diluted to obtain an aliquot estimated to contain 0.1 mg. of glycocholic acid in one ml. To this diluted aliquot was added 4 ml. of reagent sulfuric acid prepared by diluting 42 ml. of concentrated sulfuric acid with 24 ml. of water. The resulting solution was mixed thoroughly and heated for 15 minutes at 56° C. in a constant temperature bath. After cooling to room temperature, the optical density was determined at 318 m$\mu$ using the sulfuric acid reagent blank. The optical density of the original solution was obtained by multiplying the optical density of the diluted aliquot by the volume ratio of diluted aliquot to original solution.

Into two 25-ml. aliquots of sodium glycocholate solution were introduced 250 mg. of "Dowex 1 x 2" and "Dowex 1 x 4" respectively. This represented a resin weight equal to the weight of sodium glycocholate in solution. The resin was allowed to stand in the solution for four hours. At the end of this time the optical density of each aliquot was measured as described above.

The optical densities of the solutions before and after resin treatment are summarized in Table 1:

TABLE 1

| Resin | Original Optical Density | Final Optical Density | Percent Removal |
|---|---|---|---|
| "Dowex 1 x 2" | 27.00 | 0.545 | 98 |
| "Dowex 1 x 4" | 27.00 | 0.925 | 96.5 |

Since the optical density of sodium glycocholate solutions is directly proportional to the concentration, the percentage removal of sodium glycocholate can be calculated from the original and final optical densities. As shown in Table 1 "Dowex 1 x 2" removed 98% of the sodium glycocholate from the solution and "Dowex 1 x 4" removed 96.5% of the sodium glycocholate. The percentage removal of sodium glycocholate is an approximate indication of the effectiveness of the resin in vivo, showing that "Dowex 1 x 2" is somewhat more effective than the more highly cross-linked "Dowex 1 x 4." This was confirmed in in vivo tests.

The effect of various resins on reducing the blood level of cholesterol was tested in vivo. The results are given in Examples 2, 3 and 4.

Example 2

Male Kerr white leghorn chickens, all nine weeks old, and weighing between 800 g. and 1,000 g., with an average weight of about 900 g., were divided into groups of 10 birds each. Two groups served as test groups, and two other groups were used as control groups. All four groups received atherogenic diet having the following composition in percentage by weight:

| | Percent |
|---|---|
| Yellow corn meal | 46.3 |
| Soybean meal | 30.0 |
| Fish meal | 10.0 |
| Cottonseed oil | 5.0 |
| Cholesterol | 2.0 |
| Alfalfa meal | 2.0 |
| Steamed bone meal | 2.0 |
| Ground limestone | 1.5 |
| Sodium chloride | 0.5 |
| Choline chloride | 0.1 |
| Manganese sulfate | 0.02 |
| Inositol | 0.05 |
| Vitamin suplements and inerts | Balance |

The vitamin supplements included the following in the amounts indicated per 100 grams of feed:

| | | |
|---|---|---|
| p-Aminobenzoic acid | mg | 15.0 |
| Niacin | mg | 2.0 |
| Calcium pantothenate | mg | 1.5 |
| Pyridoxine | mg | 0.5 |
| Riboflavin | mg | 0.5 |
| Thiamine | mg | 0.25 |
| Vitamin A | units | 4000 |
| Vitamin D | do | 750 |
| Menadione | mcg | 50 |
| Biotin | mcg | 12.5 |
| Vitamin $B_{12}$ | mcg | 5.0 |

The average consumption of diet was about 80 grams per bird per day.

The two test groups received, in addition to the atherogenic diet, one percent by weight (based on the weight of diet) of "Dowex 1 x 1" and "Dowex 1 x 2," respectively, in the chloride form. This amounted to about 800 mg. per bird per day based on an average feed consumption of 80 g. per bird per day. After four days the blood plasma cholesterol levels of the four groups were found to be as follows:

| | Mg./100 cc. |
|---|---|
| Test group 1 ("Dowex 1 x 1") | 77 |
| Test group 2 ("Dowex 1 x 2") | 118 |
| Control group A | 286 |
| Control group B | 269 |

EXAMPLE 3

Male, Kerr white leghorn chickens, all nine weeks old and divided into groups of ten birds each, were given a basal diet having the following composition:

| | Percent |
|---|---|
| Yellow corn meal | 53.3 |
| Soybean meal | 30.0 |
| Fish meal | 10.0 |
| Alfalfa meal | 2.0 |
| Steamed bone meal | 2.0 |
| Ground limestone | 1.5 |
| Sodium chloride | 0.5 |
| Choline chloride dry mix (25% choline chloride) | 0.4 |
| Manganese sulfate | 0.02 |
| Inositol | 0.05 |
| Vitamin supplements [1] and inerts | 0.2 |

[1] Same as in atherogenic diet in Example 1.

It will be noted that the composition of the basal diet is the same as that of the atherogenic diet except for the replacement of cottonseed oil and cholesterol with cornmeal.

One test group received in addition to the basal diet 1%, by weight, of "Dowex 1 x 2." Two additional groups served as controls. The blood plasma cholesterol concentrations of the test group and the two control groups after four days were found to be as follows:

| | Mm./100 cc. |
|---|---|
| Test group 5 ("Dowex 1 x 2") | 60 |
| Control group G | 79 |
| Control group H | 74 |

EXAMPLE 4

Two groups of nine-week old, male Kerr white leghorn chickens, consisting of ten birds in each group, received the atherogenic diet described in Example 1. These birds received, admixed with diet, 1% dry weight of "Dowex 1 x 2" hydroxyl form. A control group of 98 birds received the same atherogenic diet without the "Dowex 1 x 2." Blood plasma cholesterol determinations were made at the end of four days. The blood plasma cholesterol concentrations, in milligrams per 100 cc.: (mg. percent), were as follows:

| | Mg./100 cc. |
|---|---|
| Test group 9 ("Dowex 1 x 2") | 118 |
| Test group 10 ("Dowex 1 x 2") | 176 |
| Average of test groups 9 and 10 | 147 |
| Control group K (98 birds) | 284 |

The foregoing examples illustrate the substantial reduction of blood cholesterol level in chickens which is achieved by the administration of a glycocholic acid-binding polymer according to this invention. Similar results are attained in dogs as shown by the examples which follow.

EXAMPLE 5

The effect of "Dowex 1 x 2" on the blood plasma cholesterol level of a dog was studied in a test in which the dog was observed first as a control and then as a test animal. During the control period, which lasted 51 days, the dog was given a commercial canine diet with no supplements. A 70-day test period followed, during which the dog received "Dowex 1 x 2" in addition to the basal diet received during the control period. The "Dowex 1 x 2" was admixed with the diet. The dog received 25 g. of "Dowex 1 x 2" on the first day of the test period, 50 g. on the second day, 75 g. on the third day, and 100 g. on the fourth and each succeeding day, except the fifth and sixth days when the dog fasted.

During the control period the blood plasma cholesterol fluctuated between 94 mg./100 cc. and 110 mg./100 cc., and the body weight declined from 18.4 kg. to 17.7 kg. During the test period, the blood plasma cholesterol level fell steadily from 104 mg./100 cc. to 73 mg./100 cc., showing that "Dowex 1 x 2" is effective in lowering blood cholesterol levels. Results are summarized in the following table:

|  | Blood Plasma Cholesterol, mg. Percent | Body Weight, Kg. |
|---|---|---|
| Control period: |  |  |
| Day 1 | 110 | 18.4 |
| Day 11 | 94 | 18.3 |
| Day 22 | 107 | 18.0 |
| Day 25 | 95 | 17.9 |
| Day 39 | 108 | 17.6 |
| Day 51 | 103 | 17.7 |
| Test period: |  |  |
| Day 1 | 104 | 17.7 |
| Day 3 | 91 |  |
| Day 8 | 79 | 17.8 (est.) |
| Day 35 | 75 | 16.7 |
| Day 70 | 73 | 17.6 |

EXAMPLE 6

A series of polymeric amines was subjected to two tests. In the first, the resin was allowed to stand at 100% humidity until it had become equilibrated. The moisture content was then determined. In the second, the procedure of Example 3 was followed with each resin. The results for those resins having a final moisture content of 65% or greater after equilibration with 100% humid air are given in Table 2. The results obtained with some resins having less than 65% moisture content are given in Table 3. The resins listed in Table 3, although not identified were mostly chemically similar to those in Table 2 but differed in particle size, degree of cross-linking and similar factors including the all important one of hygroscopy. Note that resins 20, 33 and 34 are ones whose internal use as gastric neutralizers has been previously described in the prior art.

TABLE 3

| Resin No.: | Percent Moisture After Equilibration | Blood Cholesterol, mg./100 cc. |
|---|---|---|
| 17 | 42 | 260 |
| 18 | 60 | 224 |
| 19 | 38 | 268 |
| 20 | 9.0 | 257 |
| 21 | 46 | 265 |
| 22 | 7 | 260 |
| 23 | 61 | 230 |
| 24 | 53 | 217 |
| 25 | 59 | 230 |
| 26 | 2.0 | 261 |
| 27 | 63 | 212 |
| 28 | 50 | 200 |
| 29 | 60 | 217 |
| 30 | 56 | 231 |
| 31 | 64 | 267 |
| 32 | 0 | 250 |
| 33 | 9.5 | 189 |
| 34 | 54 | 185 |

EXAMPLE 7

Patients suffering from jaundice, severe pruritis and high serum bile acid concentrations (15 to 36 μg. per ml.) are given 10 g. of the resin 2 of Example 6 orally per day. Pruritis ceases in each patient and the serum bile acid concentrations drop markedly. One patient with biliary cirrhosis, after 15 days of such treatment, has a serum bile acid concentration of 4.1 μg. per ml., having started with 23.7 μg. per ml.

When the oral administration of the resin is stopped, bile acid concentrations increase and pruritis reappears.

EXAMPLE 8

The procedure of Example 1 is followed except that the mixtures with resin are well stirred and the bile acid content is measured after the times given below in Table 4. The resins used are referred to by the numbers used in Tables 2 and 3, to facilitate comparison with the other properties. It is clear from these results and from those in Example 6 that, by this test, the resin must bind within 5 minutes at least 30% of the glycocholic acid in order to be effective in binding bile acids in the gut, as shown

TABLE 2

| Number | Resin Type | Special Differences | Percent Moisture after Equilibration | Blood Cholesterol, mg./100 cc. |
|---|---|---|---|---|
| 1 | A | Dowex 1 x 1 | 88 | 84 |
| 2 | A | Dowex 1 x 2 | 75 | 86 |
| 3 | A | Dowex 1 x 1 soaked in acrylic acid, latter polymerized. | 68.5 | 119 |
| 4 | A | Dowex 2 x 1, ground to minus 400 mesh | 82.5 | 108 |
| 5 | A | Dowex 1 x 0.5 | 88 | 148 |
| 6 | A | β-Picolinonium salt instead of $(CH_3)_3N+$ | 68 | 129 |
| 7 | A | Dowex 1 x 2, minus 200 mesh | 78 | 89 |
| 8 | A | Dowex 1 x 2, minus 200 mesh, less hydrated. | 75 | 85 |
| 9 | A | Dowex 1 x 2, minus 200 mesh, still less hydrated. | 75 | 90 |
| 10 | A | Similar to Dowex 1 x 1 but with only 40% quaternized sites. | 86 | 80 |
| 11 | B | —Also quaternized | 90.5 | 50 |
| 12 | A | Like Dowex 1 type, but aryl rings also have $CH_3$. | 76 | 104 |
| 13 | A | Like Dowex 1 type, but aryl rings also have Cl and some CHO. | 78 | 94 |
| 14 | B | Unquaternized | 86 | 67 |
| 15 | B | —Unquaternized but more cross-links | 81 | 86 |
| 16 | B | —Quaternized but more cross-links than No. 11. | 80 | 127 |

Resin types:

(A) Polystyrene cross-linked with divenylbenzene, then chloromethylated and the chlorine reacted with amines.

(B) Polyethylene imine, cross-linked.

by secondary results, such as lowering blood cholesterol, even though after much longer times in the in vitro test they show eventually good sequestration of the glycocholic acid.

TABLE 4

| Resin No.: | Percent Binding of Glycocholic Acid | | | |
|---|---|---|---|---|
| | 5 min. | 30 min. | 120 min. | 240 min. |
| 2 | 95.2 | 95.8 | 95.6 | 98 |
| 4 | 85.6 | 95.4 | 96.1 | |
| 5 | 38 | 78 | 83 | |
| 6 | 33 | 85 | 95 | |
| 7 | 95 | 95 | 96 | |
| 8 | 93 | 93 | 92 | |
| 9 | 95 | 96 | 95 | |
| 10 | 89 | 88 | 87 | |
| 11 | 94.5 | | | |
| 12 | 62 | | | |
| 13 | 56 | | | |
| 14 | 90 | | | |
| 20 | | | | 8.3 |
| 21 | 0 | 0 | 0 | |
| 22 | 17.5 | 41 | 54 | |
| 25 | 0 | 0 | 0 | |
| 26 | 0 | 0 | 0 | |
| 27 | 18 | 47 | 95 | |
| 28 | 0 | 14 | 32 | |
| 29 | 16 | 48 | 92 | |
| 30 | | | | <5.0 |
| 33 | | 13 | 21 | |
| 34 | | 12 | 30 | 95.7 |

EXAMPLE 9

The following is an example of a 900-calorie therapeutic diet for treatment of hypercholesteremia:

| | |
|---|---|
| Resin #2 of Example 6 (dry) _____g__ | 10.0 |
| High molecular weight carboxyvinyl polymer ("Carbopol 934"—B. F. Goodrich Co.) __g__ | 0.42 |
| Sodium alginate _____g__ | 0.90 |
| Corn oil _____g__ | 20.0 |
| Amorphous silica _____g__ | 2.5 |
| Non-fat dry milk solids _____g__ | 150.0 |
| Dry malt _____g__ | 5.0 |
| Sugar powder containing 3% starch ___g__ | 19.8 |
| Sodium cyclamate _____g__ | 0.47 |
| Sodium saccharin _____g__ | 0.12 |
| Cocoa _____g__ | 24.0 |
| Vanillin (in alcohol) _____g__ | 0.1 |
| Methylcellulose _____g__ | 2.0 |
| Vitamin A Palmitate _____mg__ | 15.0 |
| Vitamin $D_2$ _____mg__ | 0.025 |
| Ascorbic acid _____mg__ | 82.5 |
| Thiamine hydrochloride _____mg__ | 1.98 |
| Riboflavin _____mg__ | 0.24 |
| Pyridoxine hydrochloride _____mg__ | 2.48 |
| Cyanocobalamin (0.1% triturated in calcium dibasic phosphate) _____mg__ | 5.5 |
| Nicotinamide _____mg__ | 11.0 |
| Calcium pantothenate _____mg__ | 11.0 |
| Ferrous lactate _____mg__ | 36.0 |
| Manganous sulfate tetrahydrate ____mg__ | 7.5 |
| Zinc sulfate heptahydrate _____mg__ | 22.0 |
| Total _____g__ | 235.5 |

The mixture is prepared as follows. The vitamins and minerals are thoroughly mixed. The milk solids, malt, sugar, sodium cyclamate, saccharin, methylcellulose and cocoa are separately mixed. The vanillin is dissolved in 500 cc. of alcohol and added to the latter mixture, followed by rinsing the container with 250 cc. more alcohol. The vitamin-mineral mixture is then added and all are thoroughly mixed and comminuted. The therapeutic resin, carboxyvinyl polymer, and sodium alginate are then mixed and the corn oil is added. The slurry is stirred while the silica is added. The slurry is then added to the powdered mixture previously prepared, comminuted, air dried, and stored in airtight containers.

EXAMPLE 10

The following is an example of a 100-calorie maintenance dose for treatment of hypercholesteremia:

| | G. |
|---|---|
| Non-fat dry milk solids _____ | 60 |
| Resin #2 from Example 6 _____ | 13.5 |
| High molecular weight carboxyvinyl polymer ("Carbopol 934"—B. F. Goodrich) _____ | .42 |
| Methylcellulose _____ | 2.0 |
| Sucrose _____ | 9.40 |
| Sodium cyclamate _____ | 0.10 |
| Cocoa _____ | 5.00 |
| Vitamin-mineral mixture _____ | 2.0 |
| Dry malt _____ | 5.0 |
| Total _____ | 97.42 |

The vitamin-mineral mixture is the same vitamin-mineral mixture shown in Example 9 from Vitamin A down, used in the same proportions. The composition is prepared by the same procedure as in Example 9, omitting the ingredients used there but not called for in the above formula.

EXAMPLE 11

The following is an example of a zero calorie oral composition for use in treating pruritis:

| | |
|---|---|
| Resin #2 from Example 6, dry (adjust actual usage to give this amount real) _____g__ | 10.0 |
| High molecular weight carboxyvinyl polymer ("Carbopol 934"—B. F. Goodrich) ___g__ | 0.42 |
| Sodium alginate _____g__ | 0.30 |
| Cerelose _____g__ | 0.78 |
| Artificial flavoring _____cc__ | .003 |
| Alcohol as needed _____ | |
| Total _____g__ | 12.0 |

The flavoring is dissolved in alcohol and added to the cerelose, the container being rinsed with more alcohol as needed. The resin #2, carboxyvinyl polymer, and sodium alginate are mixed and the flavored cerelose is added. The mixture is then comminuted, air dried, and stored in airtight packets of 4.0 g. each.

What is claimed is:

1. The method of binding bile acids in the digestive tract into an unabsorbable form which comprises administering orally to mammals and birds 0.5 to 250 grams per day of a water insoluble non-toxic polymeric amine having a molecular weight in excess of 3,000, having the property of binding at least 30% of the available glycocholic acid within 5 minutes when exposed to an aqueous solution of an equal weight of said acid, having a polymer skeleton inert to digestive enzymes, and having a water content greater than 65% after equilibration with air at 100% relative humidity.

2. The method of claim 1 in which the polymer is a quaternary ammonium substituted polystyrene with less than 5% cross-linking.

3. The method of lowering the cholesterol blood level in a hypercholesteremic patient which comprises administering orally to mammals and birds 0.5 to 250 grams per day of a water insoluble non-toxic polymeric amine having a molecular weight in excess of 3,000, having the property of binding at least 30% of the available glycocholic acid within 5 minutes when exposed to an aqueous solution of an equal weight of said acid, having a polymer skeleton inert to digestive enzymes, and having a water content greater than 65% after equilibration with air at 100% relative humidity.

4. The method of claim 3 in which the polymer is a quaternary ammonium substituted polystyrene with less than 5% cross-linking.

5. A method of lowering elevated blood cholesterol levels which comprises orally administering to an animal subject, a low cross-linked divinylbenzene-polystyrene ion exchange resin containing quaternary ammonium groups.

References Cited

UNITED STATES PATENTS

| | | | |
|---|---|---|---|
| 2,597,439 | 5/1952 | Bodamer | 260—85.1 |
| 2,673,827 | 3/1954 | Kohlstaedt | 167—55 |
| 2,689,227 | 9/1954 | McBurney | 260—2.1 |
| 3,016,327 | 1/1962 | Schmitz | 167—22 |

OTHER REFERENCES

J.A.M.A., 151:12, March 21, 1963, pp. 22–23.

McChesney, J. Lab. and Clin. Med., 39:4, April 1952, pp. 629–636.

PSEBM, vol. 84, 1953, pp. 428–431.

Root, J. Lab. and Clin. Med., 42:3, September 1953, pp. 430–437.

ALBERT T. MEYERS, *Primary Examiner.*

MORRIS O. WOLK, I. MARCUS, *Examiners.*

A. P. FAGELSON, *Assistant Examiner.*